May 28, 1929.   F. TORKA ET AL   1,714,827
LEVELING DEVICE
Filed Nov. 20, 1926
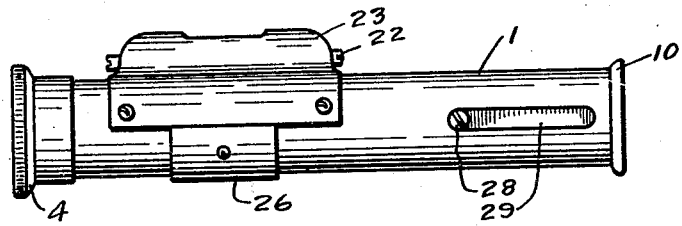
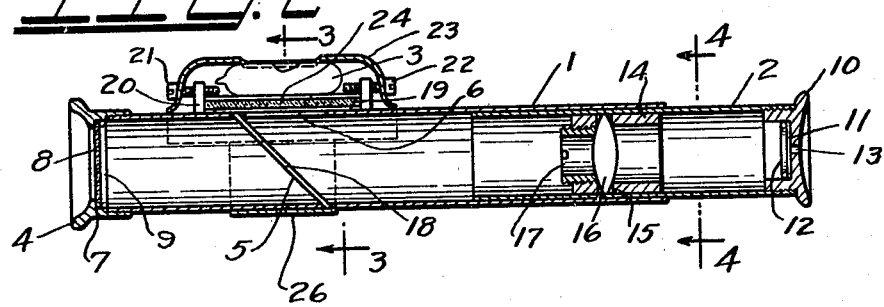
 
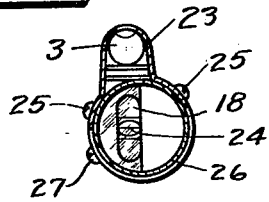 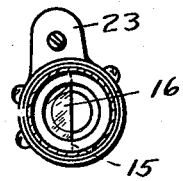
Inventor
Frank Torka
William V.E. Torka
By Harry Bowen
Attorney Patented May 28, 1929.

1,714,827

UNITED STATES PATENT OFFICE.

FRANK TORKA AND WILLIAM V. E. TORKA, OF SEATTLE, WASHINGTON.

LEVELING DEVICE.

Application filed November 20, 1926. Serial No. 149,685.

The invention is an improvement in leveling devices in that it provides a simplified mounting for the inclined reflecting surface, stadia lines in the bubble opening and also a simple means for mounting the lens.

The object of the invention is to provide a leveling device having a simplified construction.

Another object of the invention is to provide means for inserting stadia lines in the bubble opening of a leveling device.

Another object of the invention is to provide a metallic inclined reflecting surface for a leveling device.

And a further object of the invention is to provide a simple and efficient mounting for the lens of a leveling device.

With these ends in view the invention embodies, tubular telescoping members, glass in the ends of the members, a lens removably held in one of the members, a metallic inclined reflecting surface in one of the members, an adjustable glass with transverse lines etched therein above a bubble opening, a glass with a bubble therein and a suitable covering for the said glass.

Other features and advantages of the invention will appear from the following description taken in connection with the drawings, wherein:

Figure 1 is a side view of the device.
Figure 2 is a longitudinal cross section.
Figure 3 is a cross section on line 3—3 of Figure 2.
Figure 4 is a cross section on line 4—4 of Figure 2.

In the drawings the device is shown as it would be made, wherein numeral 1 indicates an outer tubular casing, numeral 2 an inner tubular casing and numeral 3 a glass containing a bubble.

The casing 1 is made as shown with a sleeve 4 at one end, an inclined slot 5 in one side thereof and an opening 6 through which the bubble in the glass 3 may be seen. The sleeve 4 is provided with a recess 7 having a glass 8 therein which is held in place by a spring ring 9. This sleeve is screwed on the end of the casing 1, as shown. The casing 2 is also provided with a similar sleeve which is indicated by the numeral 10 and which is provided with a glass 11 that is held by a spring ring 12. In the center of the member 10 is a small opening 13 through which a person using the device will look. On the interior of the casing 2 is also a sleeve 14 having a semi-circular opening 15 in one side thereof and in this opening is a semi-circular lens 16 that is held by a threaded sleeve 17, which provides a comparatively small opening to limit the vision to the reflector.

A polished metal plate 18 is placed in the slot 5 so that it extends from the side to the center of the casing 1 as shown in Figure 3. This will form a mirror which will reflect the position of the bubble in the glass 3 through the opening 6.

Below the glass 3 is a glass plate 19 that is held in a frame 20 which is readily adjustable by screws 21 and 22 that pass through the ends of a cap 23. Three transverse lines, as indicated by the numeral 24 are etched in the glass 19 thereby forming clear and distinct lines. The central one of these lines indicates the level position and the stadia lines at either side indicate angles of inclination which in the present case would designate a distance of one foot in 25 feet. The cap 23 may be held to the casing by screws 25 as shown in Figure 3 and another cap which is indicated by the numeral 26, and which forms a cover for the lower portion of the slot 5 may be held to the casing by a screw 27.

It will be understood that changes may be made in the construction without departing from the spirit of the invention, one of which changes may be in the design or arrangement of the casing, another may be in the use of other means for mounting and adjusting the position of the glass 19 and still another may be in the arrangement of the lens or in the use of other means for mounting the same.

The construction will be readily understood from the foregoing description. To use the device it may be assembled as shown and it will be observed that the inner casing 2 may be drawn outward to the position shown in Figure 2, when it is desired to use the device. This movement is controlled by a screw 28 which is threaded into the casing 2 and projects into a slot 29 in the casing 1. It will be observed that one half of the device is open all the way through whereas the other half is provided with the lens 16 and the reflecting surface 18, and the bubble glass 3 is eccentrically mounted so that it will be directly above the reflecting surface 18. By etching the lines 24 in the glass it is possible to provide the stadia lines and make them absolutely accurate.

Having thus fully described the invention what we claim as new and desire to secure by Letters Patent is:

1. In a device of the class described, a plurality of tubular telescoping members, glasses in the outer ends of the said tubular members, a sleeve having a semi-circular slot in one of the said tubular members, the semi-circular lens in a semi-circular slot in the sleeve in one of the said members, a threaded sleeve for holding the lens in the said slot, a metallic reflector in an inclined semi-circular slot in the wall of one of the said tubular telescopic members and in line with the said semi-circular lens, a bubble glass above the said inclined reflector and an adjustable glass between the said bubble glass and reflector having a plurality of lines etched thereon.

2. In a leveling instrument, a plurality of telescopic members, a semi-circular magnifying lens in one of the said telescopic members, means for mounting the said lens, said lens mounting means having a comparatively small opening in the center thereof to eliminate side reflections from the walls of the telescopic members, a semireflector removably positioned in line with the said semi-magnifying lens, a bubble glass above the said inclined reflector, a glass plate between the said bubble glass and reflector, said plate having a plurality of lines etched thereon, and means for adjusting the position of the said glass plate.

In testimony whereof we hereby affix our signatures.

FRANK TORKA.
WILLIAM V. E. TORKA.